(12) United States Patent
Ogawa et al.

(10) Patent No.: US 11,402,024 B2
(45) Date of Patent: Aug. 2, 2022

(54) GATE VALVE

(71) Applicant: SMC CORPORATION, Tokyo (JP)

(72) Inventors: Hiroshi Ogawa, Okegawa (JP); Takashi Nagao, Abiko (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/341,523

(22) Filed: Jun. 8, 2021

(65) Prior Publication Data

US 2021/0388907 A1    Dec. 16, 2021

(30) Foreign Application Priority Data

Jun. 16, 2020  (JP) .............................. JP2020-103857

(51) Int. Cl.
| | | |
|---|---|---|
| *F16K 3/02* | (2006.01) | |
| *F16K 3/314* | (2006.01) | |
| *F16K 51/02* | (2006.01) | |

(52) U.S. Cl.
CPC .............. *F16K 3/0281* (2013.01); *F16K 3/02* (2013.01); *F16K 3/0272* (2013.01); *F16K 3/314* (2013.01); *F16K 51/02* (2013.01)

(58) Field of Classification Search
CPC ........ F16K 3/0281; F16K 3/02; F16K 3/0272; F16K 3/314; F16K 51/02
USPC ................................................. 251/326–329
See application file for complete search history.

(56) References Cited

U.S. PATENT DOCUMENTS

| | | | |
|---|---|---|---|
| 6,082,706 A | | 7/2000 | Irie |
| 6,736,368 B2* | | 5/2004 | Osawa ................... F16K 3/184 |
| | | | 251/158 |
| 7,100,892 B2* | | 9/2006 | Iwabuchi ................ F16K 3/184 |
| | | | 251/204 |
| 7,134,642 B2* | | 11/2006 | Seitz ......................... F16K 3/18 |
| | | | 251/293 |
| 8,657,257 B2* | | 2/2014 | Shimoda ................... F16K 3/18 |
| | | | 251/300 |

FOREIGN PATENT DOCUMENTS

| | | |
|---|---|---|
| EP | 3 511 600 | 7/2019 |
| EP | 3 754 239 A1 | 12/2020 |
| JP | 2005-291221 A | 10/2005 |

OTHER PUBLICATIONS

Extended European Search Report dated Dec. 9, 2021 in European Patent Application No. 21178158.8, 6 pages.

* cited by examiner

*Primary Examiner* — John Bastianelli
(74) *Attorney, Agent, or Firm* — Oblon, McClelland, Maier & Neustadt, L.L.P.

(57) ABSTRACT

A gate valve includes a valve plate and a valve rod that are detachably connected along a rod axis by screwing a connecting screw in a screw hole formed at an end of a valve rod through a screw insertion hole formed in the valve plate. The valve plate includes a contact portion that is in contact with the connecting screw. When the connecting screw is loosened to detach the valve plate from the valve rod, the valve plate is displaced along the rod axis together with the connecting screw via the contact portion to move to a valve-plate detaching position at which the connecting screw comes completely out of the screw hole of the valve rod. Accordingly, the valve plate can be detached from the valve rod easily and reliably even if the valve rod is tightly inserted in the valve plate mounting hole.

7 Claims, 10 Drawing Sheets

GATE VALVE

TECHNICAL FIELD

The present invention relates to gate valves in which a valve plate is detachably connected to the head of a valve rod with a connecting screw.

BACKGROUND ART

Semiconductor processing apparatuses use a gate valve in opening and closing an opening to a vacuum chamber. The gate valve is configured such that a valve plate attached to an end of a valve rod is housed in a valve casing, this valve casing is attached to the vacuum chamber, and an opening formed in a side wall of the valve casing is opened and closed with the valve plate. In this case, the opening is closed by pushing a sealing member attached to the valve plate against a valve seat around the opening.

In such a gate valve, the sealing member degrades gradually with use, which requires to replace it with a new sealing member at degradation. This required much trouble and time in replacement because after removing the gate valve from the vacuum chamber, after the gate valve is detached from the vacuum chamber, the valve plate had to be detached from the valve rod and taken out of the valve casing, and then the sealing member had to be replaced. For that reason, a gate valve in which the valve plate can be detached from the valve rod easily and quickly is demanded for easy and quick replacement of the sealing member.

PTL 1 discloses a gate valve in which the valve plate can be detached from the valve rod and can be taken out of the valve casing, with the gate valve attached to the vacuum chamber. This improved gate valve is configured such that the valve plate and the valve rod are detachably connected by inserting the upper end of the valve rod into an attaching hole formed in the lower surface of the valve plate and screwing a connecting screw into a screw hole formed in an end of the valve plate through a screw insertion hole formed in the valve plate. The valve plate can be detached from the valve rod and taken out of the upper surface of the valve casing to the outside by removing a cover at the top of the valve casing and loosening the connecting screw. This improved gate valve therefore does not need to detach the gate valve from the vacuum chamber in replacing the sealing member, and only the valve plate can be taken out of the valve casing easily and quickly.

The gate valve disclosed in PTL 1 is configured such that the valve plate is detached from the valve rod using a tool including a wrench and a screw by loosening the connecting screw connecting the valve plate and the valve rod with the wrench of the tool to detach the connecting screw from the screw hole of the valve rod and then screwing the screw of the tool into a removing screw hole of the valve plate and lifting the valve plate with the tool.

In the case where the valve rod is loosely inserted in the mounting hole of the valve plate, like the improved gate valve disclosed in PTL 1, the valve plate can be detached from the valve rod by lifting the valve plate with a tool. However, if the valve rod is tightly inserted in the valve-plate attaching hole to prevent the relative rotation of the valve plate and the valve rod, it is difficult to detach the valve plate from the valve rod by lifting the valve plate with a tool.

CITATION LIST

Patent Literature

PTL 1: Japanese Unexamined Patent Application Publication No. 2005-291221

SUMMARY OF INVENTION

Technical Problem

A technical object of the present invention is to provide a gate valve in which a valve plate can be detached from a valve rod easily and reliably even if the connecting portion of the valve rod is tightly inserted in the connecting hole of the valve plate.

Solution to Problem

To achieve the above object, the present invention provides a gate valve in which a valve plate and a valve rod are detachably connected along a rod axis by screwing a connecting screw in a screw hole formed at an end of a valve rod along the rod axis through a screw insertion hole formed in a valve plate, wherein the valve plate includes a contact portion that is in contact with the connecting screw, and when the connecting screw is detached from the screw hole to detach the valve plate from the valve rod, the valve plate is displaced along the rod axis together with the connecting screw by an impellent force of the connecting screw acting on the valve plate via the contact portion to move to a valve-plate detaching position which is a position at which the connecting screw comes out of the screw hole of the valve rod completely.

In the present invention, preferably, the connecting screw includes a screw shaft in which a helical groove is formed around an outer periphery and a screw head larger in diameter than the screw shaft, wherein the screw head has an operation hole with which a tool for a rotating operation is to be engaged, and wherein the screw insertion hole includes a counterbore in which the screw head of the connecting screw is fitted and an insertion portion through which the screw shaft of the connecting screw passes, wherein, in the counterbore, the contact portion is formed so as to be in contact with the screw head of the connecting screw.

In the present invention, the contact portion includes a ring-shaped member attached to an inner periphery of the counterbore, wherein the ring-shaped contact portion is in contact with an upper surface of the screw head of the connecting screw. In this case, a washer is preferably interposed between the screw head and the contact portion.

Alternatively, the contact portion may include a rod-like member attached to the valve plate in such a manner that an end protrudes to an interior of the counterbore, and the screw head of the connecting screw may include a contact groove in which the rod-like contact portion is fitted.

In the present invention, the connecting screw is prevented from coming off the valve plate by being in contact with the contact portion also after the valve plate is detached from the valve rod.

In the present invention, when the valve plate is connected to the valve rod with the connecting screw, a connecting hole of the valve plate and a connecting portion of the valve rod are tightly fitted in each other by a protrusion formed at part of the connecting portion being fitted in the connecting hole, and when the valve plate moves to the valve-plate detaching position, the connecting hole and the connecting portion are loosely fitted because the protrusion of the connecting portion comes out of the connecting hole.

Advantageous Effects of Invention

According to the present invention, when the connecting screw is loosened to detach the valve plate from the valve rod, the impellent force of the connecting screw acts on the valve plate via the contact portion formed on the valve plate to move the valve plate together with the connecting screw to a valve-plate detachable position. This allows the valve plate to be detached from the valve rod easily and reliably even if the connecting portion of the valve rod is tightly inserted in the connecting hole of the valve plate.

DESCRIPTION OF EMBODIMENTS

Figure 1:
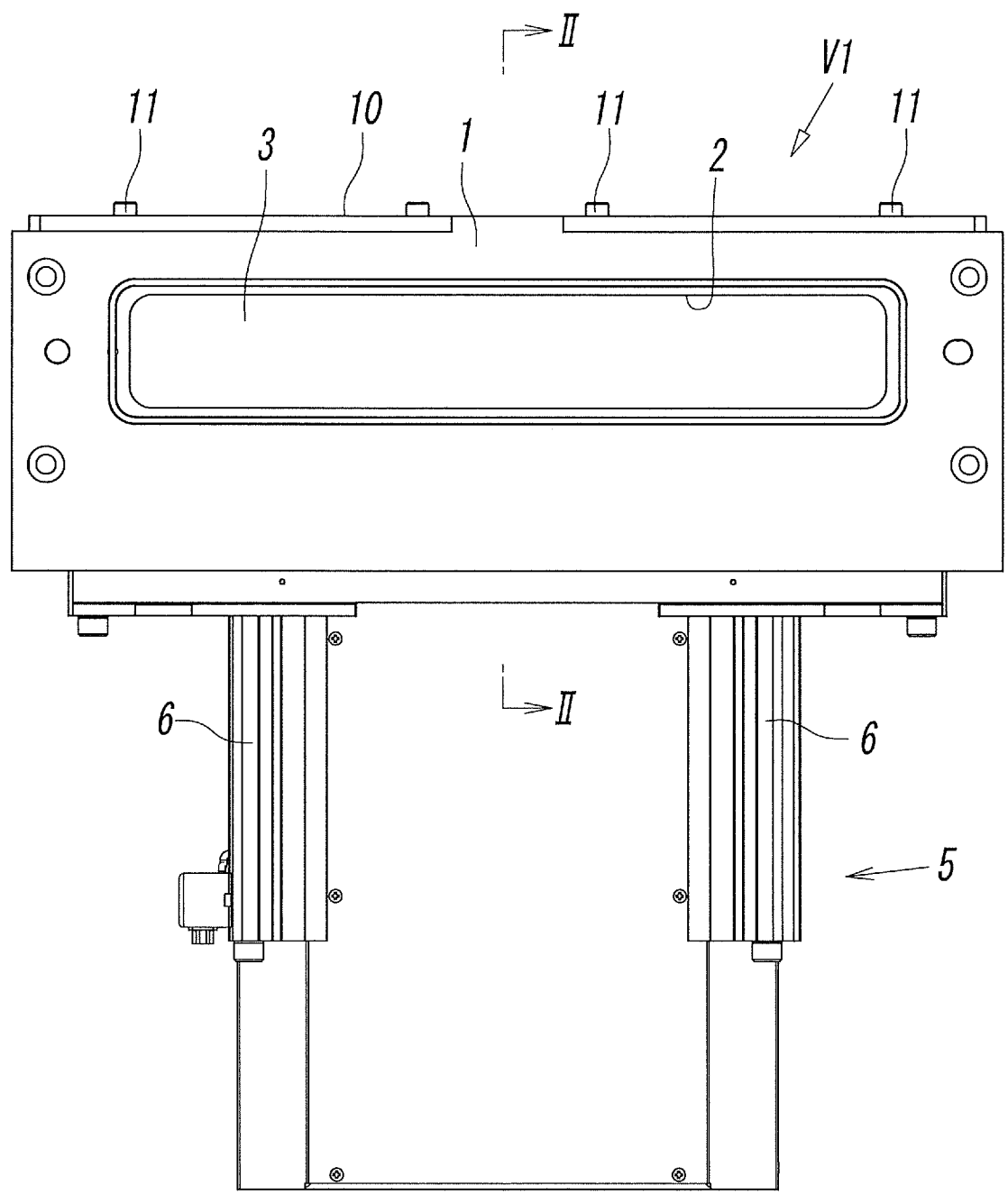
FIG. 1 is a front view of a gate valve of a first embodiment.
Figure 10:
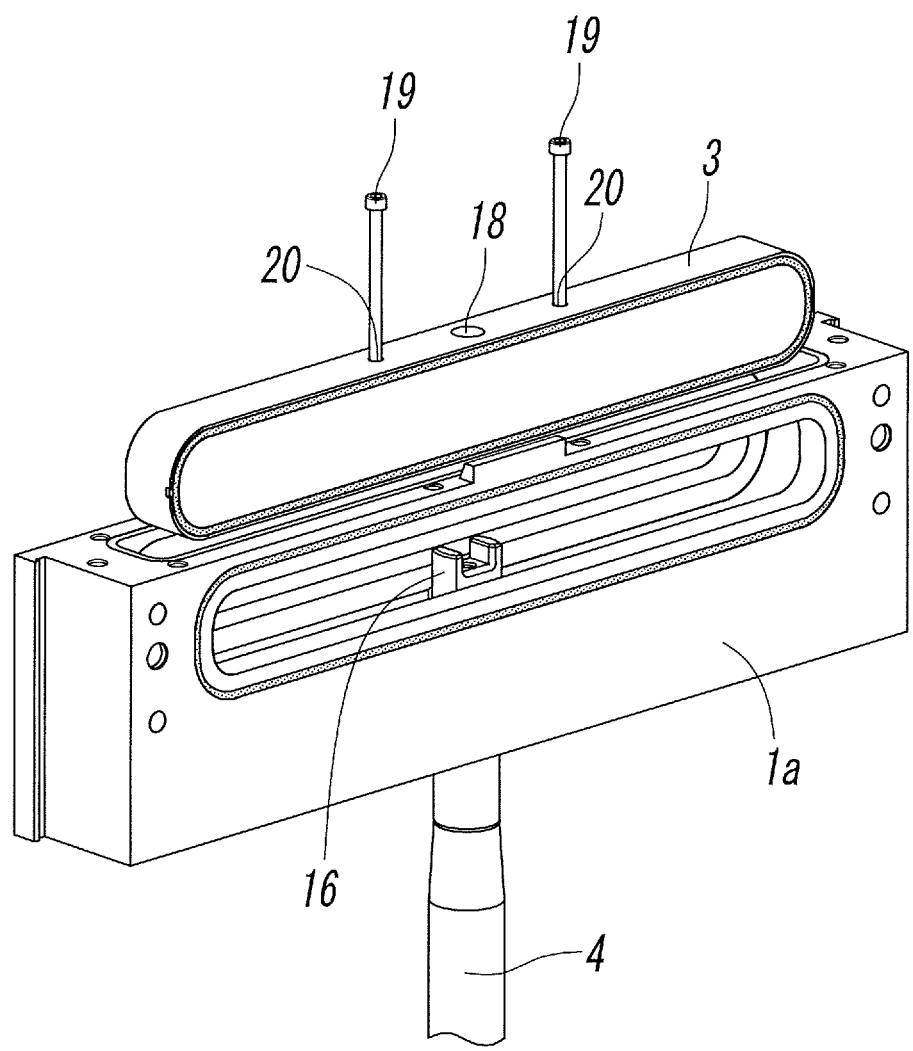
FIG. 10 is a perspective view of the main components in a state in which the valve plate is detached from the valve rod.

FIGS. 1 and 10 illustrate a first embodiment of a gate valve according to the present invention. The gate valve V1 is attached to a vacuum chamber (not shown) for use and includes a valve casing 1 having an opening 2 that opens to a vacuum chamber, a valve plate 3 that opens and closes the opening 2 in the valve casing 1, a valve rod 4 for opening and closing operations connected to the valve plate 3, and a valve drive unit 5 that drives the valve rod 4. The valve plate 3 is moved up and down between a raised position for closing the opening 2 (the solid line position in FIG. 2) and a lowered position for opening the opening 2 (the chain line position in FIG. 2) by driving the valve rod 4 with the valve drive unit 5.

The valve drive unit 5 includes a driving mechanism 6 such as an air cylinder. Since the configurations and operations of the valve drive unit 5 and the driving mechanism 6 are well known, descriptions thereof will be omitted.

The valve casing 1 has a laterally elongated rectangular box shape. Of the front and back side walls 1a and 1b of the valve casing 1, the front side wall 1a connected to the vacuum chamber includes the laterally elongated rectangular opening 2. A flat valve seat 1c enclosing the opening 2 is formed on the inner surface of the side wall 1a. The opening 2 is closed by the valve plate 3 moving to the raised position indicated by the solid line in FIG. 2 and then changing in position to the front side wall 1a to push the sealing member 7 against the valve seat 1c.

Figure 7:
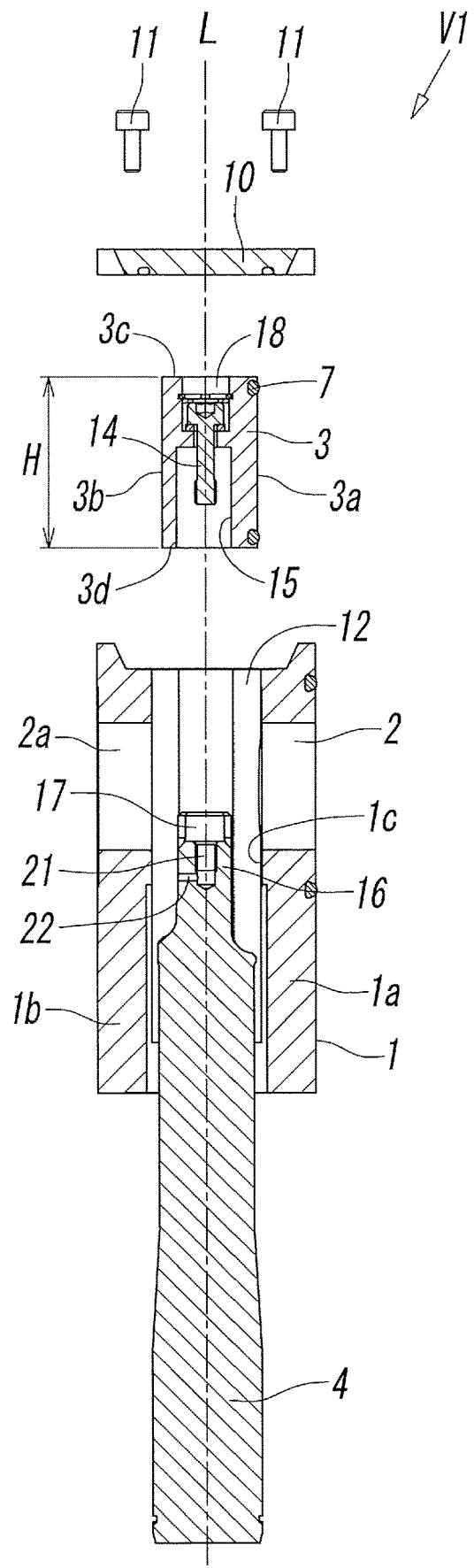
FIG. 7 is an exploded cross-sectional view of the gate valve.
Figure 8:
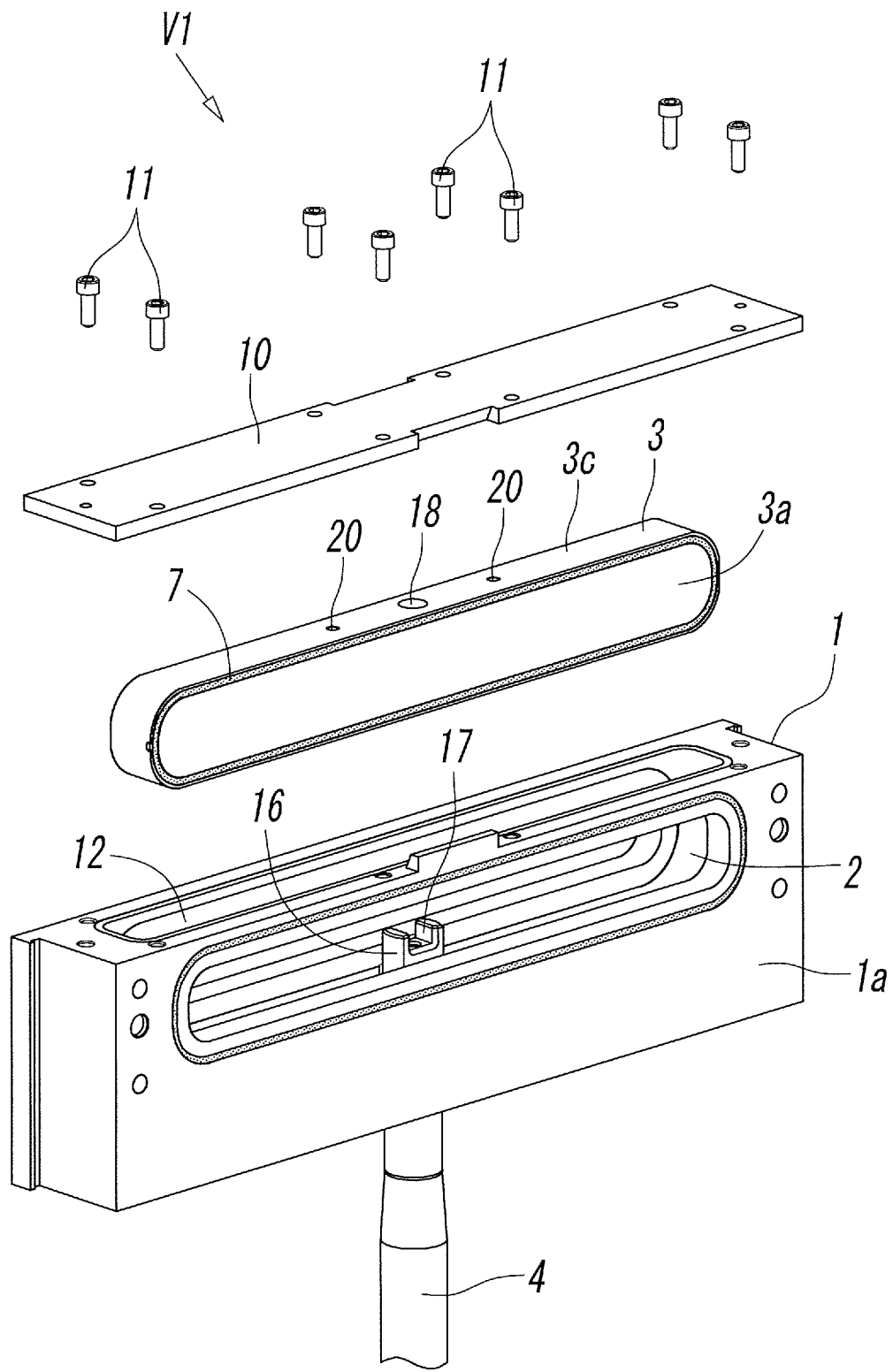
FIG. 8 is a perspective view of FIG. 7.

A cover 10 is detachably attached to the top of the valve casing 1 with a plurality of cover attaching screws 11. As shown in FIGS. 7 and 8, the top of the valve casing 1 can be opened by removing the cover 10, the valve plate 3 can be detached from the valve rod 4 along the rod axis L through a window hole 12 at the top of the opened valve casing, and the detached valve plate 3 can be taken up from the valve casing 1.

The back side wall 1b of the valve casing 1 also has an opening 2a. However, the opening 2a is not opened and closed by the valve plate 3.

The valve plate 3 has a laterally elongated rectangular shape in front view, as is apparent from FIG. 8. The opposite ends of the valve plate 3 in the longitudinal direction are semicircular or nearly circular because the four corners of the rectangle are chamfered in an arc. As shown in FIG. 7, the valve plate 3 includes a valve front surface 3a fitted with the sealing member 7, a valve back surface 3b opposite to the valve front surface 3a, a valve upper surface 3c, and a valve lower surface 3d. The valve front surface 3a, the valve back surface 3b, the valve upper surface 3c, and the valve lower surface 3d are substantially flat.

The valve plate 3 is detachably connected to the upper end of the valve rod 4 along the rod axis L with a connecting screw 14. For the connection, a connecting hole 15 in which a connecting portion 16 at the upper end of the valve rod 4 is fitted is formed upward along the rod axis L at the center of the valve lower surface 3d in the longitudinal direction. The depth of the connecting hole 15 is merely a little larger than half of the height (vertical width) H of the valve plate 3, so that the connecting hole 15 does not pass through the valve plate 3 in the direction of the height H.

Figure 4:
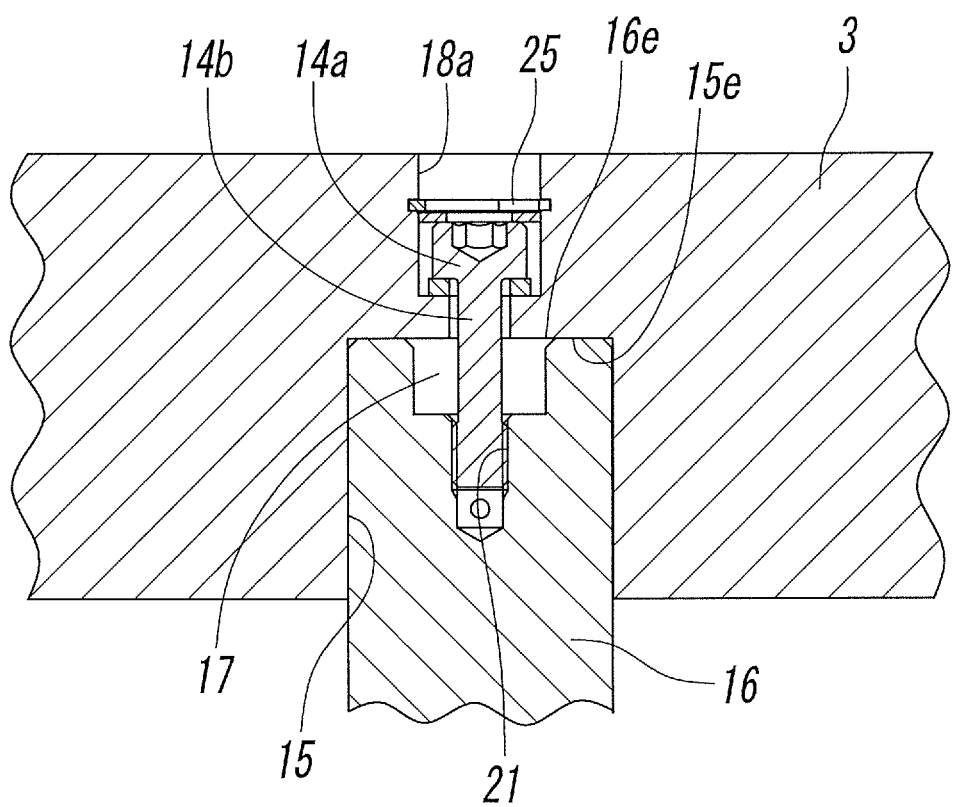
FIG. 4 is a cross-sectional view taken along line IV-IV of FIG. 3.
Figure 5:
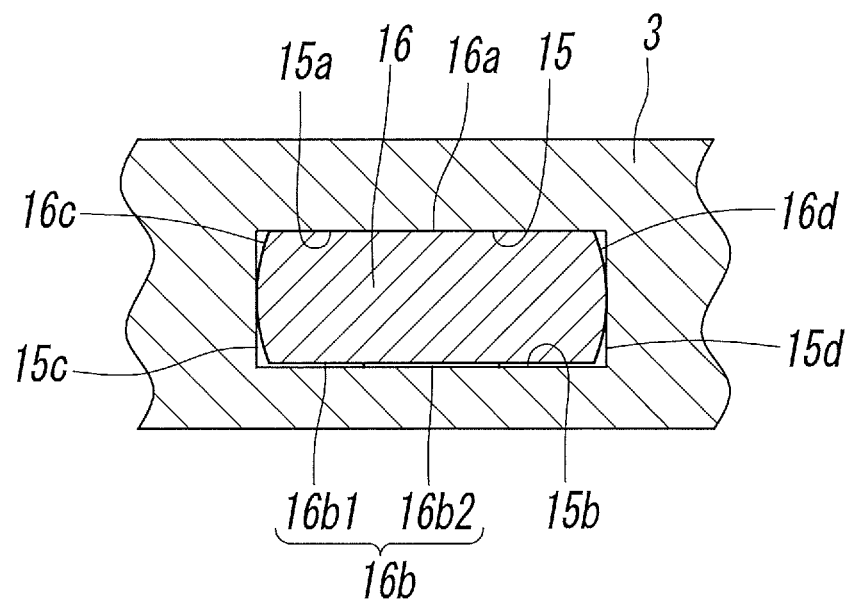
FIG. 5 is a cross-sectional view taken along line V-V of FIG. 3.
Figure 6:
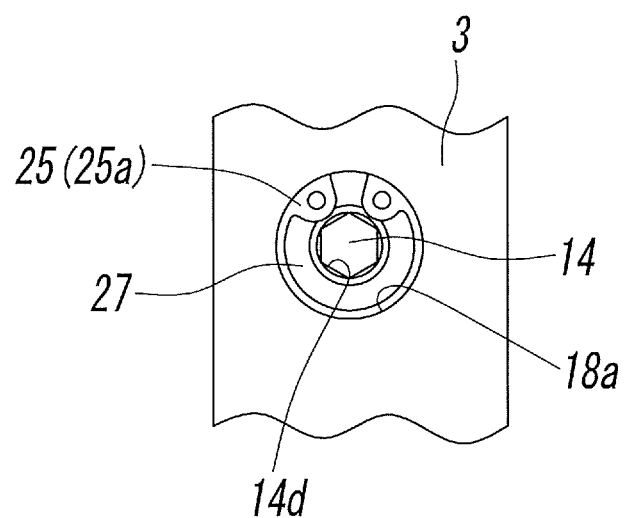
FIG. 6 is a plan view of the main components of FIG. 3.

The connecting hole 15 has a rectangular shape that is long in the longitudinal direction of the valve plate 3 in cross section, as apparent from FIGS. 4 and 5. A first hole surface 15a and a second hole surface 15b on one side and the other side of the connecting hole 15 in the widthwise direction are flat surfaces parallel to each other. A third hole surface 15c and a fourth hole surface 15d on one side and the other side of the connecting hole 15 in the longitudinal direction are also flat surfaces parallel to each other.

Figure 3:
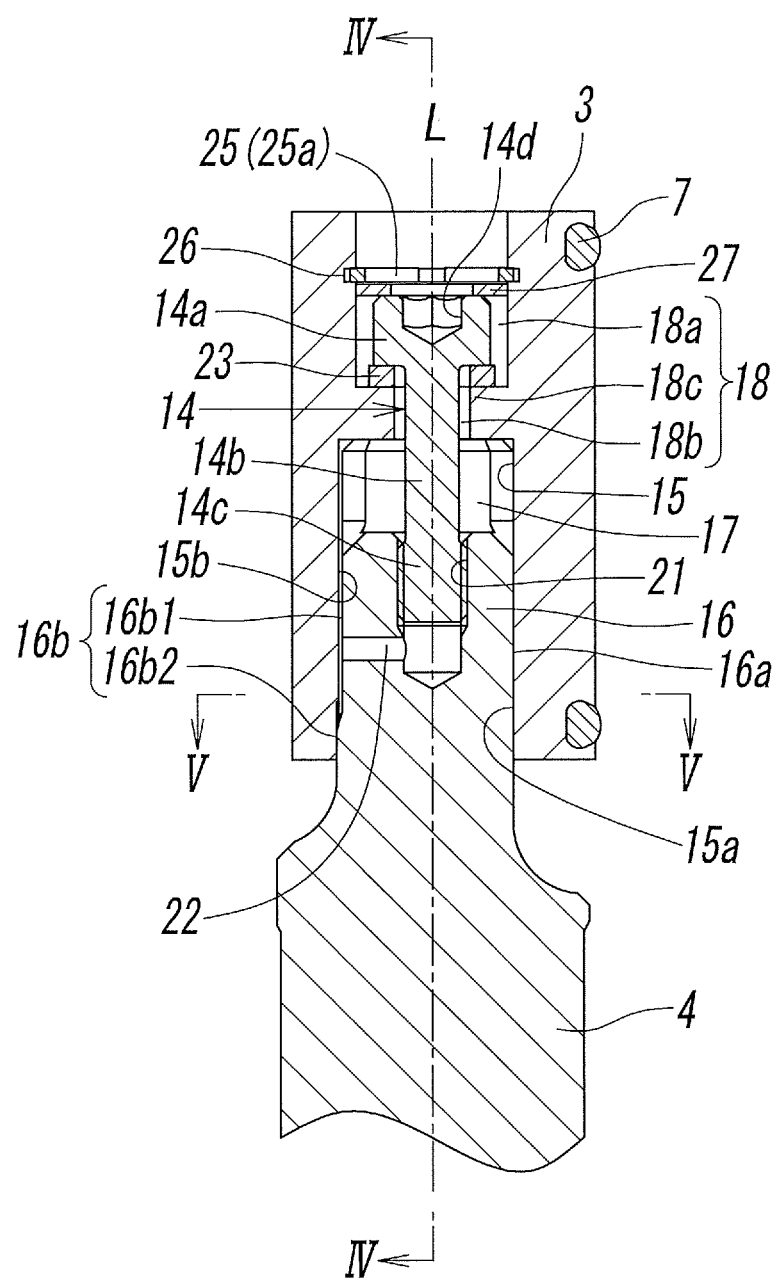
FIG. 3 is an enlarged view of the main components of FIG. 2.

As shown in detail in FIGS. 3 and 8, the valve upper surface 3c of the valve plate 3 has a screw insertion hole 18 through which the connecting screw 14 passes and screw-rod attaching holes 20 in which screw rods 19 (see FIG. 10) for lifting the valve plate 3 by hand are to be attached.

The screw insertion hole 18 is formed at the center of the valve plate 3 in the longitudinal direction along the rod axis L so as to reach the connecting hole 15. The screw insertion hole 18 has a circular counterbore 18a in which a screw head 14a of the connecting screw 14 is housed and a circular insertion portion 18b in which a screw shaft 14b of the connecting screw 14 is inserted. The counterbore 18a is larger in diameter than the insertion portion 18b.

The screw-rod attaching holes 20 are formed at two positions that are symmetric about the screw insertion hole 18 and have a depth so as not to pass through the valve plate 3 in the height H direction.

The connecting portion 16 of the valve rod 4 is formed at the upper end of the columnar valve rod 4. The cross-sectional shape of the connecting portion 16 is a rectangle that is long in the longitudinal direction of the valve plate 3, as apparent from FIGS. 3 to 5. Of a first side surface 16a and a second side surface 16b on one side and the other side of the connecting portion 16 in the widthwise direction, the first side surface 16a on one side is entirely flat, while the second side surface 16b on the other side includes a flat portion 16b1 parallel to the first side surface 16a and a protrusion 16b2 partly formed only at part of the lower end of the flat portion 16b1. Since the protrusion 16b2 protrudes outward from the flat portion 16b1, the thickness of the connecting portion 16 (the dimension in the widthwise direction) is larger at the portion of the protrusion 16b2 than that at the flat portion 16b1.

A third side surface 16c and a fourth side surface 16d on one end and the other end of the connecting portion 16 in the longitudinal direction are arcuate.

Inserting the connecting portion 16 of the valve rod 4 into the connecting hole 15 of the valve plate 3 and fixing the valve plate 3 to the valve rod 4 with the connecting screw 14 causes the protrusion 16b2 of the second side surface 16b of the connecting portion 16 to fit in the connecting hole 15 into contact with the lower end of the second hole surface 15b to thereby strongly push the first side surface 16a of the connecting portion 16 against the first hole surface 15a of the connecting hole 15, causing the connecting portion 16 to be firmly pressure-fitted in the connecting hole 15, as shown in FIG. 3.

Figure 9:
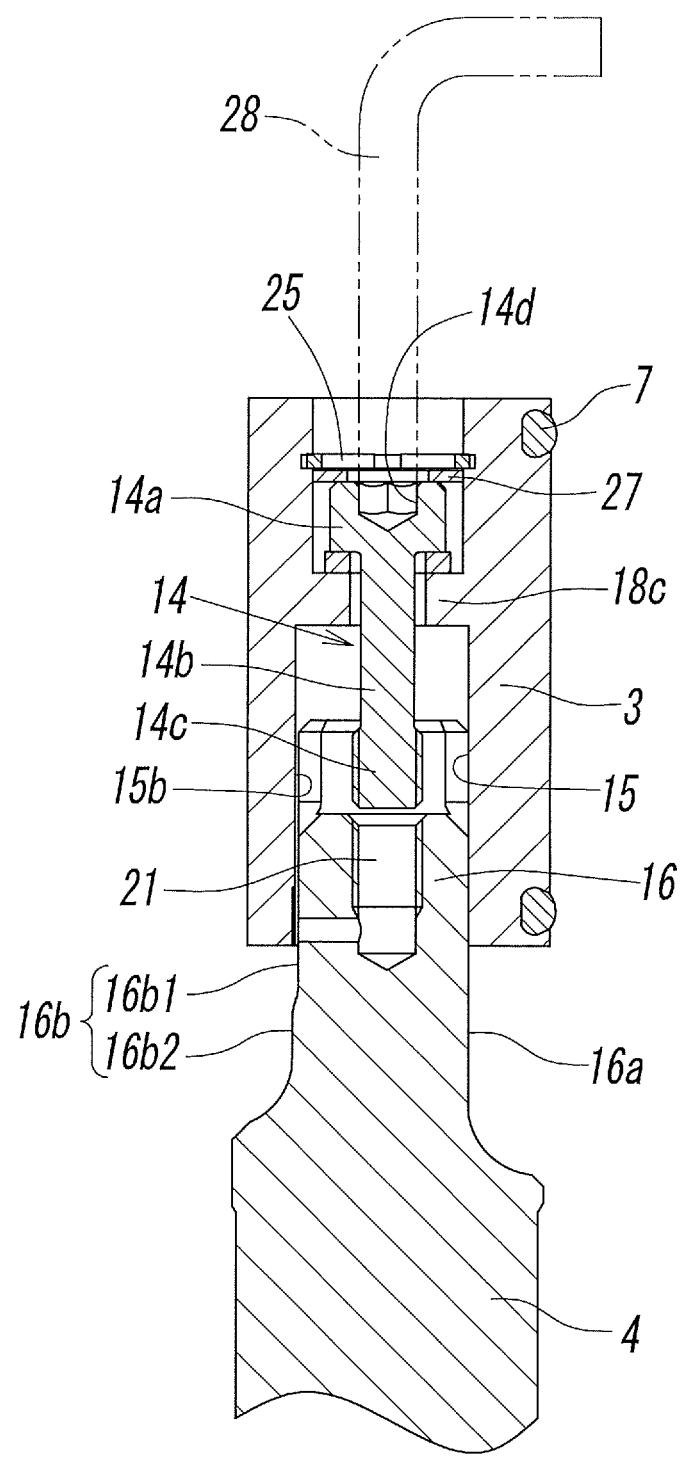
FIG. 9 is a cross-sectional view of the main components illustrating a state in which the connecting screw is loosened, and the valve plate is displaced to a valve plate detaching position.

However, when the protrusion 16b2 of the second side surface 16b comes off the connecting hole 15 downward to come out of contact with the second hole surface 15b, as shown in FIG. 9, only the flat portion 16b1 is kept fitted in the connecting hole 15. This loosens the fitting of the connecting portion 16 to the connecting hole 15, making it easy to detach the valve plate 3 from the valve rod 4.

A recess 17 is provided at the upper end of the connecting portion 16 so as to cross the longitudinal center of the connecting portion 16 in the widthwise direction of the connecting portion 16. A screw hole 21 for screwing the connecting screw 14 is provided at the bottom of the recess 17 along the rod axis L. An air vent 22 for letting out the air in the screw hole 21 when the connecting screw 14 is screwed is provided near the lower end of the screw hole 21. The air vent 22 is open to the flat portion 16b1 of the second side surface 16b of the connecting portion 16.

The connecting screw 14 includes a screw shaft 14b having a helical groove (external thread) 14c at the end and the circular screw head 14a larger in diameter than the screw shaft 14b. At the top of the screw head 14a, a hexagonal operation hole 14d with which a tool 28 (see FIG. 9) such as a hexagonal wrench is to be engaged for a rotating operation is provided. By inserting the connecting screw 14 into the screw insertion hole 18 of the valve plate 3 and screwing the external thread 14c at the end of the screw shaft 14b into the screw hole 21 at the upper end of the valve rod 4, the valve plate 3 is connected to the upper end of the valve rod 4. At that time, the lower surface of the screw head 14a of the connecting screw 14 is in contact with the upper surface of a bottom wall 18c of the counterbore 18a via a washer 23.

The counterbore 18a of the screw insertion hole 18 formed in the valve plate 3 is provided with a contact portion 25 that comes into contact with the screw head 14a of the connecting screw 14 when the connecting screw 14 is loosened to detach the valve plate 3 from the valve rod 4. The contact portion 25 is formed of a ring-shaped member 25a, which is a C-ring in the illustrated example. The counterbore 18a has an attaching groove 26 around the inner periphery to attach the ring-shaped member, that is, the C-ring 25a. The C-ring 25a is attached to the attaching groove 26, and the upper outer periphery of the screw head 14a is in contact with the C-ring 25a via a ring-shaped washer 27. Since the C-ring 25a and the washer 27 are ring-shaped, the operation of tightening or loosening the connecting screw 14 with the tool 28 can be performed through the hollows of the C-ring 25a and the washer 27.

In the gate valve V1 with the above configuration, when the valve plate 3 is to be detached from the valve rod 4 to perform maintenance, such as replacement of the sealing member 7, the cover 10 at the top of the valve casing 1 is detached to open the window hole 12. In this state, the connecting screw 14 is detached from the screw hole 21 at the upper end of the valve rod 4 by engaging the tool 28 with the operation hole 14d of the screw head 14a of the connecting screw 14, as shown in FIG. 9, and rotating the connecting screw 14 to loosen it with the tool 28. This causes the outer periphery of the upper surface of the screw head 14a to come into contact with the contact portion 25 via the washer 27 as the connecting screw 14 moves in the loosening direction (upward in FIG. 9) along the rod axis L, and the impellent force of the connecting screw 14 to act upward on the valve plate 3 via the contact portion 25. This causes the valve plate 3 to move in the direction of the rod axis L with respect to the valve rod 4 together with the connecting screw 14.

When the valve plate 3 moves to a position at which the external thread 14c at the lower end of the screw shaft 14b of the connecting screw 14 comes out of the screw hole 21 of the valve rod 4 completely, the protrusion 16b2 at the lower end of the second side surface 16b of the connecting portion 16 of the valve rod 4 comes out downward from the connecting hole 15 of the valve plate 3. This brings the connecting hole 15 and the connecting portion 16, which have been tightly pressure-fitted, into a loosely fitted state, allowing the valve plate 3 to be easily detached from the valve rod 4. Thus, this position is a valve-plate detaching position at which the valve plate 3 can be detached from the valve rod 4 by lifting the valve plate 3 by hand.

Accordingly, by attaching the screw rods 19 in the two screw-rod attaching holes 20 formed in the upper surface of the valve plate 3 and lifting the valve plate 3 by holding the screw rods 19 in both hands, the valve plate 3 can be detached from the valve rod 4 to the outside of the valve casing 1, as shown in FIG. 10.

Since the screw head 14a of the connecting screw 14 is kept engaged with the bottom wall 18c and the contact portion 25 in the counterbore 18a after the valve plate 3 is taken out of the valve casing 1, the connecting screw 14 does not come off the valve plate 3.

The valve plate 3 taken out from the valve casing 1 receives necessary maintenance, such as replacement of the sealing member 7, after the screw rods 19 are detached as appropriate.

When the valve plate 3 for which maintenance has been completed is to be attached the valve rod 4 again, an operation reverse to the operation for detaching the valve plate 3 is performed.

Specifically, as shown in FIG. 10, the screw rods 19 are attached to the valve plate 3, the valve plate 3 is housed in the valve casing 1 with the screw rods 19 in hands, the connecting portion 16 of the valve rod 4 is fitted in the connecting hole 15 of the valve plate 3, and the valve plate 3 is moved down to a position at which the end of the screw shaft 14b of the connecting screw 14 comes into contact with the inlet of the screw hole 21 at the upper end of the connecting portion 16.

Figure 2:
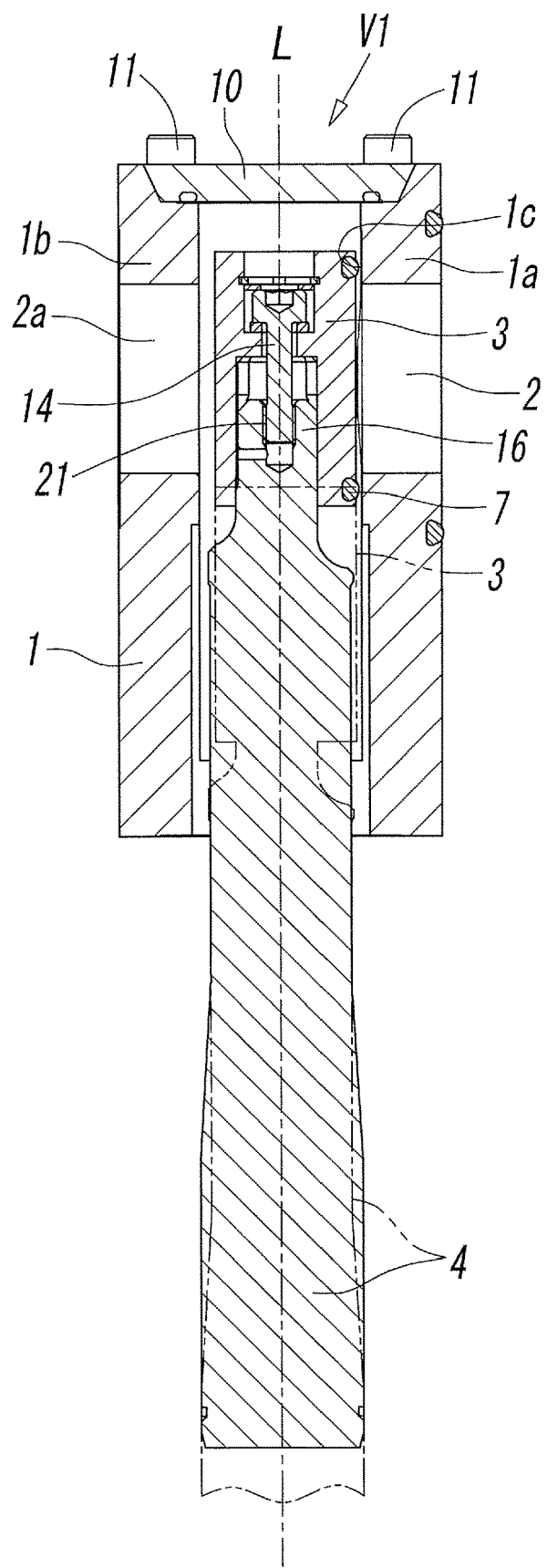
FIG. 2 is a partially enlarged cross-sectional view taken along line II-II of FIG. 1.

Next, after the screw rods 19 are detached from the valve plate 3, the connecting screw 14 is rotated and screwed with the tool 28 into the screw hole 21, as shown in FIG. 9, to a position at which an upper end face 16e of the connecting portion 16 comes into contact with a hole bottom 15e of the connecting hole 15, and the protrusion 16b2 at the lower end of the second side surface 16b of the connecting portion 16 is fitted in the connecting hole 15 into contact with the second hole surface 15b, so that the valve plate 3 is attached to the valve rod 4, as shown in FIGS. 2 to 4.

By attaching the cover 10 to the top of the valve casing 1 with the cover attaching screws 11, the mounting of the valve plate 3 is completed.

In the above example, the operation of detaching the valve plate 3 from the valve rod 4 to take it out from the valve casing 1 is performed by holding the screw rods 19 attached to the valve plate 3 in hands. Alternatively, if the valve front surface 3a or the valve back surface 3b of the valve plate 3 has a recess or the like in which a finger is to be hooked, the valve plate 3 can be detached from the valve rod 4 to the outside of the valve casing 1 using the recess. In this case, there is no need to attach the screw rods 19 to the valve plate 3, and therefore the screw rods 19 and the screw-rod attaching holes 20 are not needed.

Figure 11:
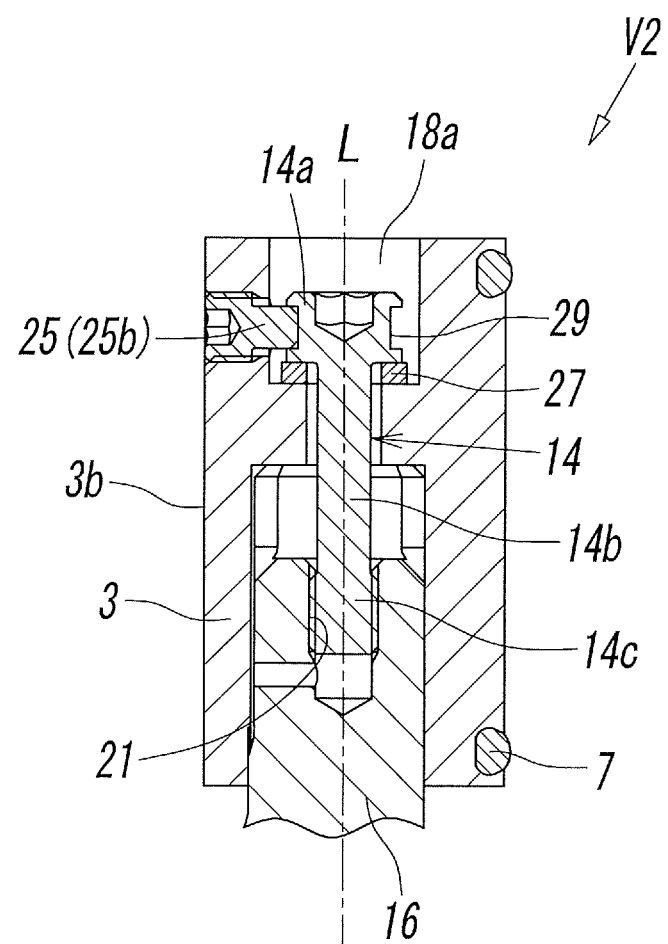
FIG. 11 is a cross-sectional view of the main components of a gate valve of a second embodiment.

FIG. 11 illustrates the main components of a gate valve V2 of a second embodiment. In the gate valve V2 of the second embodiment, the contact portion 25 at the valve plate 3 is made of a rod-like member 25b. Specifically, the rod-like member 25b is a contact screw. The rod-like member, or the contact screw 25b, is attached to the valve back surface 3b of the valve plate 3 so as to move back and force at a horizontal orientation, and an end of the contact screw 25b protrudes from the inner periphery of the counterbore 18a to the interior of the counterbore 18a.

The screw head 14a of the connecting screw 14 has a ring-shaped contact groove 29 around the outer periphery of the side surface of the screw head 14a. An end of the contact screw 25b is fitted in the contact groove 29 so as to be freely displaced in the direction of rotation about the rod axis L relative to the connecting screw 14 but is fixed in the direction of the rod axis L.

The other configuration and operation of the gate valve V2 of the second embodiment are substantially the same as the configuration and operation of the gate valve V1 of the first embodiment, and detailed descriptions thereof will be omitted.

The illustrated example includes one contact screw 25b. Alternatively, the contact screw 25b may be provided at each of the valve front surface 3a and the valve back surface 3b of the valve plate 3, that is, two at the opposite positions in the diametrical direction of the counterbore 18a.

The ring-shaped contact groove 29 may be a recessed-step-like groove formed around the rod axis L at a position near the outer periphery of the upper surface of the screw head 14a.

REFERENCE SIGNS LIST

V1,V2 GATE VALVE
3 VALVE PLATE
4 VALVE ROD
14 CONNECTING SCREW
14a SCREW HEAD
14b SCREW SHAFT
14c HELICAL GROOVE (EXTERNAL THREAD)
14d OPERATION HOLE
15 CONNECTING HOLE
16 CONNECTING PORTION
16b2 PROTRUSION
18 SCREW INSERTION HOLE
18a COUNTERBORE
18b INSERTION PORTION
21 SCREW HOLE
25 CONTACT PORTION
25a RING-SHAPED MEMBER (C-RING)
25b ROD-LIKE MEMBER (CONTACT SCREW)
27 WASHER

The invention claimed is:

1. A gate valve in which a valve plate and a valve rod are detachably connected along a rod axis by screwing a connecting screw in a screw hole formed at an end of the valve rod along the rod axis through a screw insertion hole formed in the valve plate,
wherein the valve plate includes a contact portion that is in contact with the connecting screw, and when the connecting screw is detached from the screw hole to detach the valve plate from the valve rod, the valve plate is displaced along the rod axis together with the connecting screw by an impellent force of the connecting screw acting on the valve plate via the contact portion to move to a valve-plate detaching position which is a position at which the connecting screw comes out of the screw hole of the valve rod completely.

2. The gate valve according to claim 1,
wherein the connecting screw includes a screw shaft in which a helical groove is formed around an outer periphery and a screw head larger in diameter than the screw shaft, wherein the screw head has an operation hole with which a tool for a rotating operation is to be engaged, and
wherein the screw insertion hole includes a counterbore in which the screw head of the connecting screw is fitted and an insertion portion through which the screw shaft of the connecting screw passes, wherein, in the counterbore, the contact portion is formed so as to be in contact with the screw head of the connecting screw.

3. The valve according to claim 2, wherein the contact portion includes a ring-shaped member attached to an inner periphery of the counterbore, wherein the ring-shaped contact portion is in contact with an upper surface of the screw head of the connecting screw.

4. The valve according to claim 3, wherein a washer is interposed between the screw head and the contact portion.

5. The valve according to claim 2, wherein the contact portion includes a rod-like member attached to the valve plate in such a manner that an end protrudes to an interior of the counterbore, and the screw head of the connecting screw includes a contact groove in which the rod-like contact portion is fitted.

6. The valve according to claim 1, wherein the connecting screw is prevented from coming off the valve plate by being in contact with the contact portion also after the valve plate is detached from the valve rod.

7. The valve according to claim 1, wherein, when the valve plate is connected to the valve rod with the connecting screw, a connecting hole of the valve plate and a connecting portion of the valve rod are tightly fitted in each other by a protrusion formed at part of the connecting portion being fitted in the connecting hole, and when the valve plate moves to the valve-plate detaching position, the connecting hole and the connecting portion are loosely fitted because the protrusion of the connecting portion comes out of the connecting hole.

* * * * *